(12) United States Patent
Kim et al.

(10) Patent No.: US 11,517,168 B2
(45) Date of Patent: Dec. 6, 2022

(54) ROBOT CLEANER AND OPERATING METHOD OF THE SAME

(71) Applicant: LG ELECTRONICS INC., Seoul (KR)

(72) Inventors: Eu Gene Kim, Seoul (KR); Kwan Young Son, Seoul (KR); Hyun Seob Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 377 days.

(21) Appl. No.: 16/719,859

(22) Filed: Dec. 18, 2019

(65) Prior Publication Data

US 2021/0085145 A1 Mar. 25, 2021

(30) Foreign Application Priority Data

Sep. 19, 2019 (KR) ........................ 10-2019-0115669

(51) Int. Cl.
*A47L 9/28* (2006.01)
*A47L 9/00* (2006.01)
(Continued)

(52) U.S. Cl.
CPC ............. *A47L 9/2852* (2013.01); *A47L 9/009* (2013.01); *A47L 9/2805* (2013.01); *A47L 9/2826* (2013.01); *A47L 9/2842* (2013.01); *G05B 13/027* (2013.01); *G06N 3/04* (2013.01); *G06N 3/08* (2013.01); *A47L 2201/04* (2013.01); *A47L 2201/06* (2013.01)

(58) Field of Classification Search
CPC ............. A47L 11/4011; A47L 2201/04; A47L 2201/06; A47L 9/009; A47L 9/2805; A47L 9/2826; A47L 9/2842; A47L 9/2852; G05B 13/027; G06N 3/04; G06N 3/0454; G06N 3/08
See application file for complete search history.

(56) References Cited

U.S. PATENT DOCUMENTS 8,838,268 B2 * 9/2014 Friedman ............... A47L 9/2805
700/253
9,974,422 B2 * 5/2018 Lee ........................ A47L 9/2894
(Continued)

FOREIGN PATENT DOCUMENTS

KR 1020150022550 3/2015
KR 20180015928 A * 2/2018 ........... A47L 9/2852

*Primary Examiner* — Marc Carlson
(74) *Attorney, Agent, or Firm* — Lee, Hong, Degerman, Kang & Waimey PC

(57) ABSTRACT

Provided is a robot cleaner using an artificial intelligence (AI) algorithm and/or a machine learning algorithm in a 5G environment connected for Internet of Things (IoT). The robot cleaner includes one or more sensors, a driving wheel, a suction blower, and a controller, and the controller defines a cleaning target area, identifies a user's location and a type of the user's behavior, collects life pattern information of the user including the user's location, the type of the user's behavior, and timestamps each associated therewith during the time period of one day or more, determines a cleaning schedule of the robot cleaner based on the collected life pattern information, and controls the driving wheel and the suction blower so as to perform cleaning in accordance with the determined cleaning schedule.

14 Claims, 10 Drawing Sheets

(51) Int. Cl.
    *G06N 3/08*     (2006.01)
    *G05B 13/02*     (2006.01)
    *G06N 3/04*     (2006.01)

(56) References Cited

U.S. PATENT DOCUMENTS

| | | | | |
|---|---|---|---|---|
| 2009/0194137 | A1* | 8/2009 | Friedman | A47L 9/2894 |
| | | | | 701/532 |
| 2018/0353039 | A1* | 12/2018 | Erkek | A47L 11/4066 |
| 2019/0213438 | A1* | 7/2019 | Jones | G06K 9/6274 |
| 2019/0343354 | A1* | 11/2019 | Hong | G06N 20/00 |
| 2019/0362234 | A1* | 11/2019 | Maeng | G05D 1/0246 |
| 2021/0204785 | A1* | 7/2021 | Lee | A47L 11/4011 |
| 2021/0331314 | A1* | 10/2021 | Chae | B25J 9/0003 |

\* cited by examiner

| DATE (YYYYMMDD) | TIME (hhmmss) | AREA | TYPE OF BEHAVIOR |
|---|---|---|---|
| 20190801 | 073010 | B-1 | USE OF HAIR DRYER |
| 20190801 | 073555 | B-1 | END USE OF HAIR DRYER |
| 20190801 | 074000 | A-2 | OPEN REFRIGERATOR DOOR |
| 20190801 | 074100 | A-4 | INGEST FOOD |
| 20190801 | 075200 | C-11 | INGEST SNACK |
| 20190801 | 081010 | C-8 | GOING-OUT |
| 20190801 | 082000 | - | ABSENT |
| ⋮ | ⋮ | ⋮ | ⋮ |
| 20190801 | 172015 | C-8 | RETURNING HOME |
| ⋮ | ⋮ | ⋮ | ⋮ |

FIG. 5

ROBOT CLEANER AND OPERATING METHOD OF THE SAME

CROSS-REFERENCE TO RELATED APPLICATION

Pursuant to 35 U.S.C. § 119(a), this application claims the benefit of earlier filing date and right of priority to Korean Patent Application No. 10-2019-0115669, filed on Sep. 19, 2019, the contents of which are hereby incorporated by reference herein in its entirety.

BACKGROUND

1. Technical Field

The present disclosure relates to a robot cleaner, and more particularly, to a robot cleaner capable of determining a cleaning start time and a cleaning path by itself and a method of operating the same.

2. Description of Related Art

A robot cleaner is a vacuum cleaner configured to suck dust or debris on a driving path while driving by itself. The robot cleaner drives by itself, generates a map of a cleaning area, and determines a cleaning path on the generated map by itself.

For more efficient cleaning, the robot cleaner provides a function of allowing a user to directly set a cleaning path on a map. For example, a user may communicate with a robot cleaner through a user terminal, and set a cleaning path on a map provided by the robot cleaner.

The robot cleaner also provides a function of allowing the user to set a cleaning start time and a cleaning end time. An operation of the robot cleaner may often cause inconvenience to the user. For example, when the user is reading or resting, the operation of the robot cleaner disturbs the user's concentration or rest. For this reason, the user generally sets the start time of the robot cleaner such that the robot cleaner operates at the time when the user goes out.

Due to the change in the user's life pattern, the cleaning start time and the cleaning path that have been set previously may be inappropriate. In such cases, resetting the cleaning start time and the cleaning path may be cumbersome for the user.

Korean Patent Application Publication No. 10-2015-0022550 (related art 1) discloses an operation method of a robot cleaner in which the robot cleaner detects the contamination generation and the contamination generation location through an audio sensor, and performs cleaning of the contamination generation location. Related art 1 discloses performing cleaning when the contamination-generating action is terminated. For example, the robot cleaner is controlled to perform cleaning when the noise caused by the operation of a hair dryer is stopped.

The method of related art 1 has the advantage capable of quickly cleaning the area that needs cleaning. However, performing cleaning per one-time event may go against a decision of an efficient cleaning path for the entire cleaning area. Further, the cleaning after the contamination-generation action is terminated may also disturb the user's concentration or rest.

SUMMARY OF THE DISCLOSURE

An object of the present disclosure is to provide a robot cleaner capable of determining a cleaning schedule by itself.

Another object of the present disclosure is to provide a robot cleaner capable of determining a cleaning schedule so as not to disturb a user considering the user's life pattern.

Still another object of the present disclosure is to provide a robot cleaner capable of determining a cleaning schedule in a manner preferred by a user considering the user's life pattern.

Yet another object of the present disclosure is to provide a robot cleaner capable of cleaning areas requiring cleaning with an effective cleaning path.

The present disclosure is not limited to what has been described above, and other aspects not mentioned herein will be apparent from the following description to one of ordinary skill in the art to which the present disclosure pertains. It is also to be understood that the aspects of the present disclosure may be realized by means and combinations thereof set forth in claims.

A robot cleaner and a method of operating the robot cleaner according to embodiments of the present disclosure collect life pattern information of a user based on a sensor signal from one or more sensors, and determine a cleaning schedule of the robot cleaner based on the collected life pattern information.

A method of operating a robot cleaner according to a first aspect of the present disclosure includes defining a cleaning target area, identifying a user's location and a type of the user's behavior, based on at least one of a sensor signal from one or more sensors disposed in the robot cleaner, a sensor signal from one or more external devices, or operation state information from the one or more external devices, collecting life pattern information of the user including the user's location, the type of the user's behavior, and timestamps each associated therewith, wherein the life pattern information is collected during the time period of one day or more, determining a cleaning schedule of the robot cleaner based on the collected life pattern information, wherein the cleaning schedule includes a cleaning time and a cleaning path, and the cleaning time is selected from the times when the user is absent in the cleaning target area, and operating the robot cleaner so as to perform cleaning according to the determined cleaning schedule.

A robot cleaner according to a second aspect of the present disclosure includes one or more sensors, a driving wheel configured to move the robot cleaner on a floor, a suction blower configured to suck air, and a controller, and at this time, the controller is configured to define a cleaning target area based on a sensor signal from the one or more sensors and operation information of the driving wheel, identify a user's location and a type of the user's behavior, based on the sensor signal from the one or more sensors, collect life pattern information of the user including the user's location, the type of the user's behavior, and timestamps each associated therewith, wherein the life pattern information is collected during a time period of one day or more, determine a cleaning schedule of the robot cleaner based on the collected life pattern information, wherein the cleaning schedule includes a cleaning time and a cleaning path, and the cleaning time is selected from the times when the user is absent in the cleaning target area, and operate the driving wheel and the suction blower so as to perform cleaning according to the determined cleaning schedule.

According to further embodiment that can be combined with any other embodiments of the present disclosure, the distribution of contaminant in the cleaning target area is determined based on the user's location and the type of the user's behavior, and the cleaning schedule is determined based on the distribution of the contaminant.

According to further embodiment that can be combined with any other embodiments of the present disclosure, a suction intensity of the vacuum cleaner is determined based on the distribution of the contaminant.

According to further embodiment that can be combined with any other embodiments of the present disclosure, the cleaning path of the robot cleaner is determined based on the cleaning path information of the vacuum cleaner operated by the user.

According to further embodiment that can be combined with any other embodiments of the present disclosure, the life pattern information is collected during a time period of one week or more, the collected life pattern information is grouped according to the day of the week, the cleaning schedule of the robot cleaner is determined based on a group of the life pattern information corresponding to the day of the week when cleaning will be performed.

According to further embodiment that can be combined with any other embodiments of the present disclosure, the cleaning path of the robot cleaner is determined based on the cleaning path information of the vacuum cleaner operated by the user.

According to further embodiment that can be combined with any other embodiments of the present disclosure, the collected life pattern information is clustered in accordance with patterns using an artificial neural network, and the cleaning schedule is determined by weight-averaging the life pattern information having a common pattern.

According to the embodiments of the present disclosure, it is possible for the robot cleaner to determine the cleaning schedule by itself considering the user's life pattern.

According to the embodiments of the present disclosure, it is possible for the robot cleaner to determine the cleaning schedule in a manner that does not cause inconvenience to the user.

According to the embodiments of the present disclosure, it is possible for the robot cleaner to determine the cleaning schedule in a manner preferred by the user.

According to the embodiments of the present disclosure, it is possible for the robot cleaner to effectively clean an area requiring cleaning.

BRIEF DESCRIPTION OF THE DRAWINGS

FIG. 5 is a diagram illustrating an example of life pattern information stored in a life pattern database according to an embodiment of the present disclosure.

DETAILED DESCRIPTION

Figure 1:
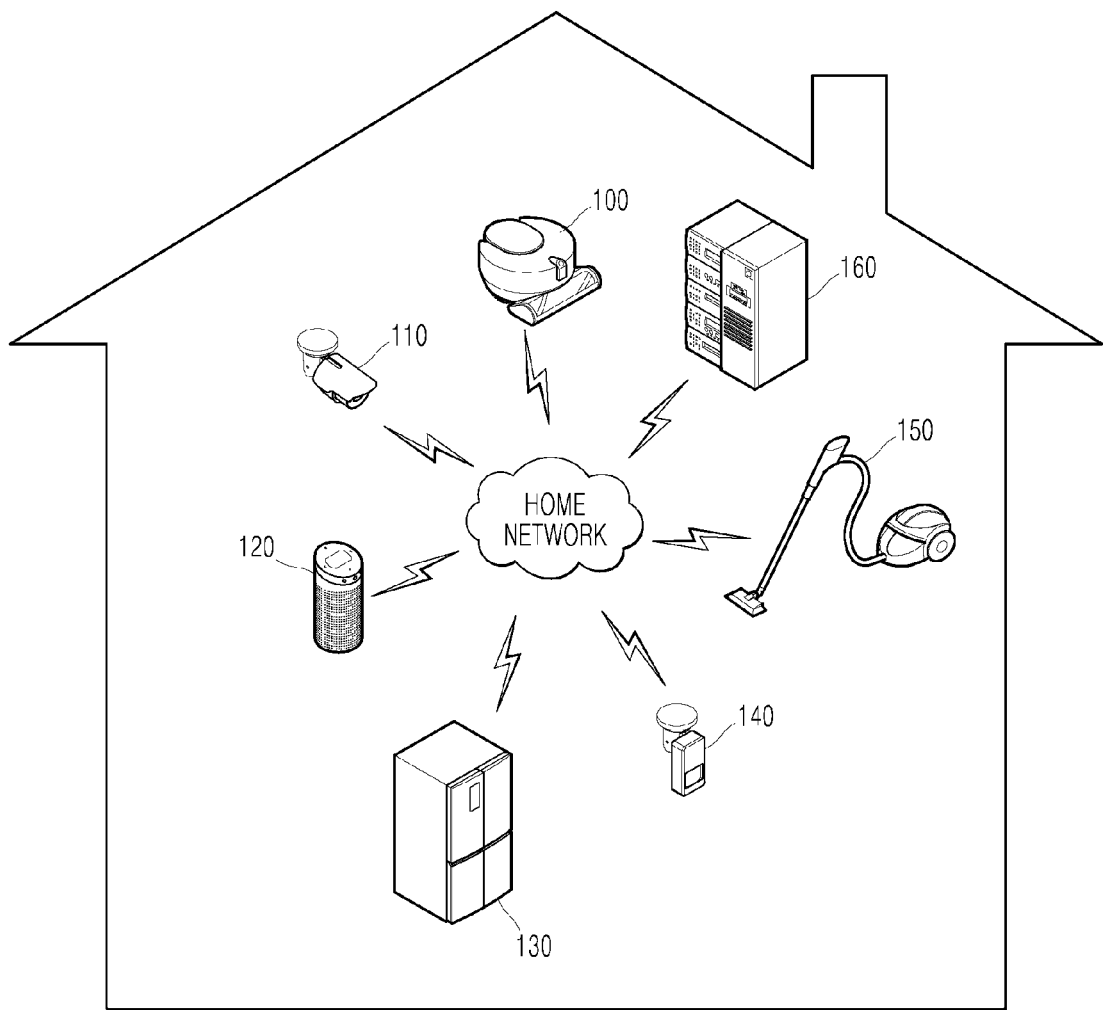
FIG. 1 is a diagram illustrating an exemplary interior environment in which a robot cleaner according to an embodiment of the present disclosure is disposed.

The advantages and features of the present disclosure and ways to achieve them will be apparent by making reference to embodiments as described below in detail in conjunction with the accompanying drawings. However, it should be construed that the present disclosure is not limited to the embodiments disclosed below but may be implemented in various different forms, and covers all the modifications, equivalents, and substitutions belonging to the spirit and technical scope of the present disclosure. The embodiments disclosed below are provided so that this disclosure will be thorough and complete and will fully convey the scope of the present disclosure to those skilled in the art. Further, in the following description of the present disclosure, a detailed description of known technologies incorporated herein will be omitted when it may make the subject matter of the present disclosure rather unclear.

The terms used in this application is for the purpose of describing particular embodiments only and is not intended to limit the disclosure. As used herein, the singular forms are intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Although the terms "ordinal numbers" such as first, second and the like are used to describe various structural elements, the structural elements should not be defined by the terms. The terms are used merely for the purpose to distinguish an element from the other elements.

As described herein, ANN is a data processing system modeled after the mechanism of biological neurons and interneuron connections, in which a number of neurons, referred to as nodes or processing elements, are interconnected in layers. ANNs are models used in machine learning and may include statistical learning algorithms conceived from biological neural networks (particularly of the brain in the central nervous system of an animal) in machine learning and cognitive science. ANNs may refer generally to models that have artificial neurons (nodes) forming a network through synaptic interconnections, and acquires problem-solving capability as the intensities of synaptic interconnections are adjusted throughout training. An ANN may include a number of layers, each including a number of neurons. Further, the Artificial Neural Network may include the synapse for connecting between neuron and neuron.

An ANN may be defined by the following three factors: (1) a connection pattern between neurons on different layers; (2) a learning process that updates synaptic weights; and (3) an activation function generating an output value from a weighted sum of inputs received from a previous layer.

An ANN may include a deep neural network (DNN). Specific examples of the DNN include a convolutional neural network (CNN), a recurrent neural network (RNN), a deep belief network (DBN), and the like, but are not limited thereto.

An ANN may be classified as a single-layer neural network or a multi-layer neural network, based on the number of layers therein.

In general, a single-layer neural network may include an input layer and an output layer.

In general, a multi-layer neural network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection intensities (synaptic weights), and if this sum exceeds a threshold value of a corresponding neuron, the neuron may be activated and output an output value obtained through an activation function.

In the meantime, a deep neural network with a plurality of hidden layers between the input layer and the output layer may be the most representative type of artificial neural network which enables deep learning, which is one machine learning technique.

An ANN may be trained using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An artificial neural network trained using training data may classify or cluster inputted data according to a pattern within the inputted data.

Throughout the present specification, an artificial neural network trained using training data may be referred to as a trained model.

Hereinbelow, learning paradigms of an artificial neural network will be described in detail.

Learning paradigms, in which an artificial neural network operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network may be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

The training data may exhibit a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection intensities are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One semi-supervised learning technique involves reasoning the label of unlabeled training data, and then using this reasoned label for learning. This technique may be used advantageously when the cost associated with the labeling process is high.

Reinforcement learning may be based on a theory that given the condition under which a reinforcement learning agent may determine what action to choose at each time instance, the agent may find an optimal path to a solution solely based on experience without reference to data.

Reinforcement learning may be performed mainly through a Markov decision process.

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters may be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size, and may also include methods that increase optimization accuracy in SGD by adjusting the momentum and step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Therefore, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters may be set to optimal values that provide a stable learning rate and accuracy.

Meanwhile, the artificial neural network may be trained by adjusting connection weights between nodes (if necessary, adjusting bias values as well) so as to produce desired output from given input. Also, the artificial neural network may continuously update the weight values through learning. Furthermore, methods such as back propagation may be used in training the artificial neural network.

Hereinafter, embodiments of the present disclosure will be described in detail with reference to the accompanying drawings, and in the description with reference to the accompanying drawings, the same or corresponding components have the same reference numeral, and a duplicate description therefor will be omitted.

FIG. 1 is a diagram illustrating an exemplary interior environment in which a robot cleaner according to an embodiment of the present disclosure is disposed. Exemplarily referring to FIG. 1, the interior environment is a home area. The home appliances are disposed in the interior environment, and the home appliances have network functionality, and are connected to a home automation server 160 and/or other home appliances by wireless or wired to form a home network. Hereinafter, the home appliance having the network functionality and connected to the home automation server and/or other home appliances to form the home network is referred to as a "home IoT device."

The home IoT devices include, but is not limited to, for example, a robot cleaner 100, a security camera 110, an artificial intelligence (AI) speaker 120, a refrigerator 130, a human body detector 140, and a vacuum cleaner 150.

The home IoT device includes a network interface for communicating with the home automation server 160 and/or other home IoT devices, and the network interface may use, for example, one or more of a fifth generation (5G) cellular network, Bluetooth, Infrared Data Association (IrDA), Internet of Things (IoT), Local Area Network (LAN), Low Power Network (LPN), Low Power Wide Area Network (LPWAN), Personal Area Network (PAN), Radio Frequency Identification (RFID), Ultra-wide Band (UWB), Wireless Fidelity (Wi-Fi), Wireless LAN (WLAN), or ZigBee communication technologies, but not limited thereto.

The home IoT device may communicate with the home automation server 160 and/or other home IoT devices directly or via one or more intermediary devices. The intermediary device may be any of the home IoT devices described above, or may be a home automation server 160, or may also be a separate network device such as a gateway, a hub, a switch, a router, a small cell, a femto cell, a pico cell, or wireless access point (WAP).

The home IoT device may identify a relative location (for example, direction and/or distance) with respect to the other home IoT devices or their absolute locations in the interior environment through communication with each other. For example, the home IoT device may receive a beacon signal from the other home IoT devices or the access point, and estimate a direction and a distance with respect to other devices using the signal intensity of the beacon signal, the received timestamp, the latency, or the like. If the location of any one device has been known, the location of the home IoT device may be determined from the direction and distance to such a device. The home automation server 160 may collect location information from the home IoT devices, and identify the location of the home IoT devices in the interior environment. In another embodiment, the home automation server 160 may also identify the location of the home IoT devices in the interior environment by the manual input of the user.

One or more home IoT devices may include one or more sensors capable of detecting their surrounding states, and share a sensor signal generated using the sensor with the home automation server 160 or the other home IoT devices. For example, the security camera 110 includes an image sensor capable of detecting an interior image. The AI speaker 120 includes a sound sensor capable of detecting a surrounding sound. The human body detector 140 includes an infrared sensor configured to detect whether a human is present around. A home appliance, such as the refrigerator 130, a TV, or an air conditioner, may also include a sound sensor capable of detecting a surrounding sound, for example, for a speech-based functionality.

In an embodiment of the present disclosure, the vacuum cleaner 150 includes one or more sensors configured to more accurately identify its location in addition to location decision using network communication as described above. The vacuum cleaner 150 may include, for example, a compass sensor, an accelerometer sensor, and a gyroscope sensor. Preferably, a sensor for identifying the location is mounted to the head of the vacuum cleaner 150.

The home IoT device may generate its own operation state information, and share the operation state information with the home automation server 160 or the other home IoT devices. The operation state information may be any information related to the operation of the home IoT device, including on/off states. For example, the operation state information of the refrigerator 130 may include opening and closing of a refrigerator door.

The operation state information of the vacuum cleaner 150 may include a cleaning path of the vacuum cleaner 150, suction intensities at points on the cleaning path, and timestamps at the points. In particular, the vacuum cleaner 150 may display the cleaning path on a map provided from, for example, the robot cleaner 100 or the home automation server 160.

The home automation server 160 may be connected to one or more home IoT devices and a user terminal (not shown) installed in the interior environment to establish a home network, and to receive and manage the operation state information or the sensor signal from one or more home IoT devices connected to the home network. The user terminal may be, but is not limited to, for example, a mobile phone, a tablet computer, a laptop computer, a palmtop computer, a desktop computer, or a smart TV.

The home automation server 160 may control operations of the home IoT devices connected to the home network. The home automation server 160 may transmit a control signal for controlling their operation to one or more devices connected to the home network. For example, the home automation server 160 may also transmit a cleaning schedule including a cleaning start time, a cleaning end time, and a cleaning path to the robot cleaner 100 so that the robot cleaner 100 may perform cleaning according to the schedule set by the home automation server 160.

Figure 2:
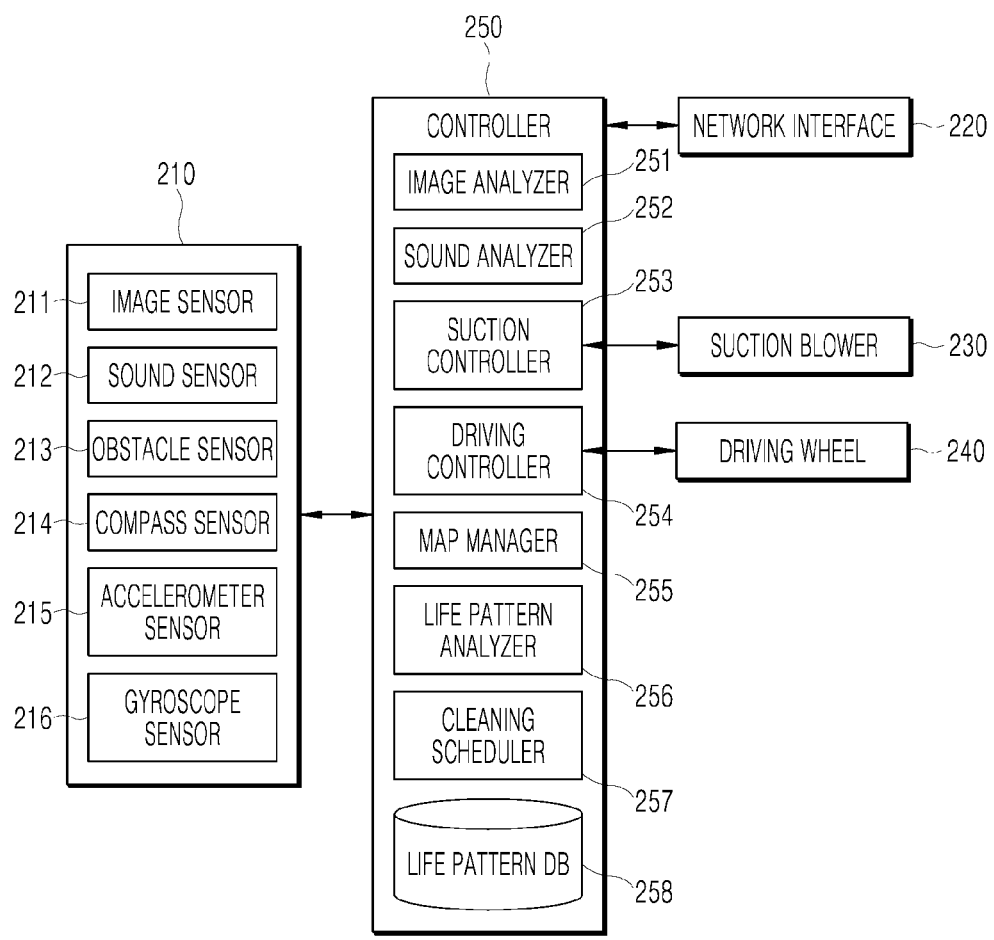
FIG. 2 is a schematic block diagram of a robot cleaner according to an embodiment of the present disclosure.

FIG. 2 is a schematic block diagram of a robot cleaner according to an embodiment of the present disclosure. The robot cleaner 100 includes one or more sensors 210, a network interface 220, a suction blower 230, a driving wheel 240, and a controller 250.

The sensor 210 generates a sensor signal by monitoring a surrounding state around the robot cleaner and a driving state of the robot cleaner, and provides the generated sensor signal to the controller 250.

The one or more sensors 210 may include an image sensor 211 (for example, a camera) configured to generate an image signal by acquiring a surrounding image, a sound sensor 212 (for example, a microphone) configured to generate a sound signal by acquiring a surrounding sound, and an obstacle sensor 213 configured to sense an obstacle such as a wall or an object or to measure a distance to the obstacle using, for example, an infrared ray, an ultrasonic wave, or a laser.

Further, the one or more sensors 210 may further include a compass sensor 214 configured to detect the orientation of the robot cleaner 100, an accelerometer sensor 215 configured to detect linear movement, and a gyroscope sensor 216 configured to detect rotational motion. The sensors 210 may be disposed at any suitable locations in order to achieve the function.

The network interface 220 provides network functionality for communicating with at least one of the home automation server 160, the home IoT devices, or the user terminal. The network interface 220 may receive the operation state information and/or the sensor signal from the home IoT devices, and receive the control signal from the home automation server 160.

The network interface 220 may use, for example, one or more of a fifth generation (5G) cellular network, Bluetooth, an Infrared Data Association (IrDA), Internet of Things (IoT), Local Area Network (LAN), Low Power Network (LPN), Low Power Wide Area Network (LPWAN), Personal Area Network (PAN), Radio Frequency Identification (RFID), Ultra-wide Band (UWB), Wireless Fidelity (Wi-Fi), wireless LAN (WLAN), or ZigBee communication technologies, but not limited thereto.

The suction blower 230 is configured to suck air through a nozzle disposed at the bottom of the robot cleaner 100, for example, by the control of the suction controller 253. The suction blower 230 sucks dust or debris together with air while sucking the air, and collects the sucked dust or debris in a dust bag.

The driving wheel 240 is configured to move or rotate the robot cleaner 100 in a straight line or curve on the floor by the control of a driving controller 254. The driving wheel 240 typically consists of a pair of wheels at the bottom of the robot cleaner 100.

The controller 250 interacts with the one or more sensors 210, the network interface 220, the suction blower 230, and the driving wheel 240 and controls the operation of the robot cleaner 100. The controller 250 is configured to receive the sensor signal from the one or more sensors 210. The controller 250 is configured to receive the sensor signal and the operation state information from another home IoT device through the network interface 220. The controller 250 is also configured to control the operations of the suction blower 230 and the driving wheel 240.

The controller 250 may include, for example, one or more processors having a circuit structured for performing functions represented by codes or instructions included in a program stored in a memory. The one or more processors may include, but is not limited to, for example, one or more of a microprocessor, a Central Processing Unit (CPU), a processor core, a multiprocessor, an image processor, a neural processor, an Application-Specific Integrated Circuit (ASIC), or a Field Programmable Gate Array (FPGA). The codes or instructions included in the program stored in the memory may be implemented to perform the operation of the controller 250 when executed by the one or more processors.

The controller 250 includes an image analyzer 251, a sound analyzer 252, a suction controller 253, a driving controller 254, a map manager 255, a life pattern analyzer 256, a cleaning scheduler 257, and a life pattern database 258. Components of the controller 250 may also be implemented by separate processors and memories, respectively, or at least some of the components of the controller 250 may be implemented by logical resource allocation of a common processor and memory.

The image analyzer 251 is configured to analyze the image signal received from the image sensor 211 or another home IoT device (for example, the security camera 110).

The sound analyzer 252 is configured to analyze the sound signal received from the sound sensor 212 or another home IoT device (for example, the AI speaker 120).

Figure 3A:
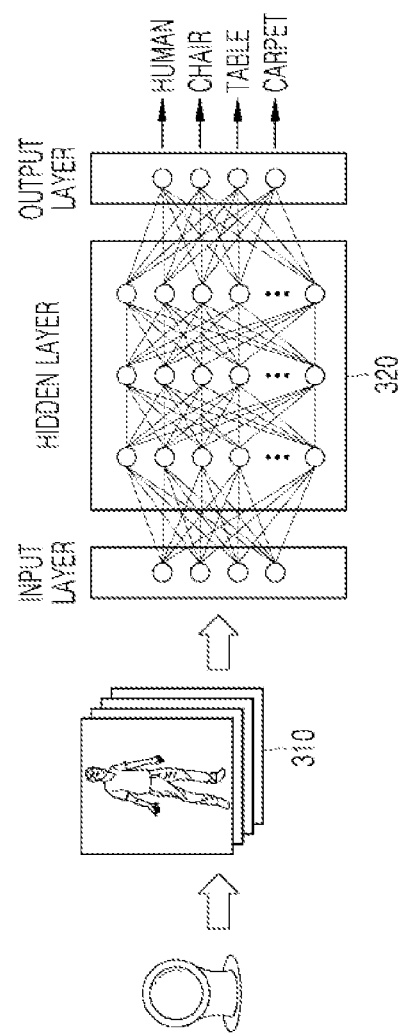
FIG. 3A is a diagram illustrating an exemplary operation of an image analyzer and FIG. 3B is a diagram illustrating an exemplary operation of a sound analyzer according to an embodiment of the present disclosure.
Figure 3B:
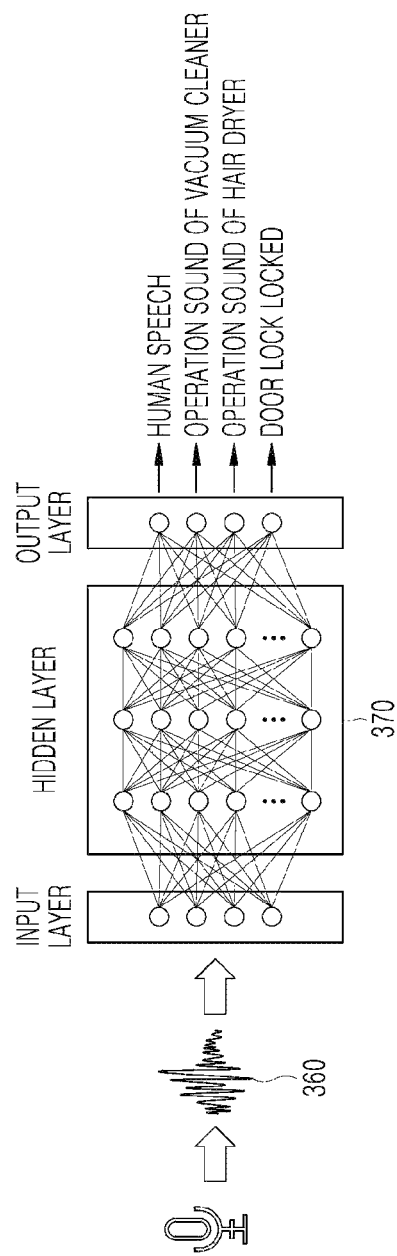

FIG. 3A is a diagram illustrating an exemplary operation of an image analyzer and FIG. 3B is a diagram illustrating an exemplary operation of a sound analyzer according to an embodiment of the present disclosure.

Referring to FIG. 3A, the image analyzer 251 includes an artificial neural network 320 that has been trained in advance using machine learning so as to identify a type of an object in an image from an input image signal 310. For example, the artificial neural network 320 of the image analyzer 251 has been trained to identify, for example, a human, a chair, a table, a bed, a dress, a curtain, a carpet, or the like that is present in the image signal 310 provided from the image sensor 211 or another home IoT device. The artificial neural network 320 may also have been trained to identify a human's behavior present in the image signal 310.

The image analyzer 251 may also estimate the location of the identified object or the location where the identified behavior occurs based on at least one of the location information of the robot cleaner 100, the orientation information of the image sensor 211, or the orientation information of the home IoT device that has transmitted the image signal.

Referring to FIG. 3B, the sound analyzer 252 includes an artificial neural network 370 that has been trained in advance using machine learning so as to identify a type of sound from the input sound signal 360. The artificial neural network 370 of the sound analyzer 252 has been trained to identify, from the input sound signal 360, for example, a human speech, an operation sound of the vacuum cleaner, an operation sound of the hair dryer, a laughing sound of children, a unlocking sound of the door lock, a locking sound of the door lock, or the like.

The sound analyzer 252 may further include an artificial neural network that has been trained in advance using machine learning so as to identify the human behavior related to speech from the human speech. At this time, the sound analyzer 252 may preprocess the sound signal 360 from the sound sensor 212 or another IoT device to remove background noise, and input only the extracted speech signal of human into the artificial neural network.

The sound analyzer 252 may also estimate the location where the sound is generated based on at least one of the location information of the robot cleaner 100, the signal latency in the sound signal from the plurality of sound sensors 212 and/or the home IoT device, or the orientation information of the sound sensor 212 and/or the home IoT device having provided the sound signal.

The suction controller 253 is configured to control the operation of the suction blower 230. The suction controller 253 may control the operation (for example, suction intensity) of the suction blower 230 according to a cleaning schedule set by the cleaning scheduler 257. The suction controller 253 may also control the operation of the suction blower 230 according to the user's setting. The suction controller 253 may also control the operation of the suction blower 230 according to a control signal from the home automation server 160. The suction controller 253 may also control the operation of the suction blower 230 based on the sensor signal from one or more sensors 210, for example, the image sensor 211 or the obstacle sensor 213.

The driving controller 254 is configured to control the operation (for example, driving direction and speed) of the driving wheel 240. The driving controller 254 is also configured to generate operation information (for example, driving direction and speed information) of the driving wheel 240 during the operation of the driving wheel 240.

The driving controller 254 may control the operation of the driving wheel (240) in a wall-following mode, for example, based on the sensor signal from the one or more sensors 210, for example, the obstacle sensor 213, the compass sensor 214, the accelerometer sensor 215, and the gyroscope sensor 216. The driving controller 254 may control the operation of the driving wheel 240 additionally based on the map information generated by the map manager 255. The driving controller 254 may also control the operation of the driving wheel 240 according to the cleaning path set by the cleaning scheduler 257. The driving controller 254 may also control the operation of the driving wheel 240 according to a control signal from the home automation server 160.

The map manager 255 is configured to generate and manage a map of the cleaning target area of the robot cleaner 100. The map manager 255 generates and updates the map based on the sensor signal from the one or more sensors 210 and the operation information of the driving wheel 240, while the robot cleaner 100 autonomously drives the interior environment.

For example, the map manager 255 may identify the location and moving direction of the robot cleaner 100 based on the sensor signal from at least one of the compass sensor 214, the acceleration sensor 215, or the gyroscope sensor 216 and/or the operation information of the driving wheel 240. The map manager 255 may identify the location of the wall or the obstacle based on the sensor signal from the obstacle sensor 213. The map manager 255 generates the map of the cleaning target area based on the location of the robot cleaner 100, the moving direction of the robot cleaner 100, and the location of the wall or the obstacle, which have been identified. For example, the map manager 255 generates the map of the interior environment based on the sensor signal from the obstacle sensor 213 when the robot cleaner 100 drives along the wall in the wall-following mode.

The map manager 255 may also receive the user's input for generating and modifying the map from the user terminal through the network interface 220. The map manager 255 may also receive the map of the cleaning target area from the home automation server 160.

Meanwhile, the map of the cleaning target area generated by the map manager 255 may not exactly match the map of the interior environment. For example, areas of the interior environment where the robot cleaner 100 may not drive physically or by the user's setting may be excluded from the map of the cleaning target area.

Figure 4:
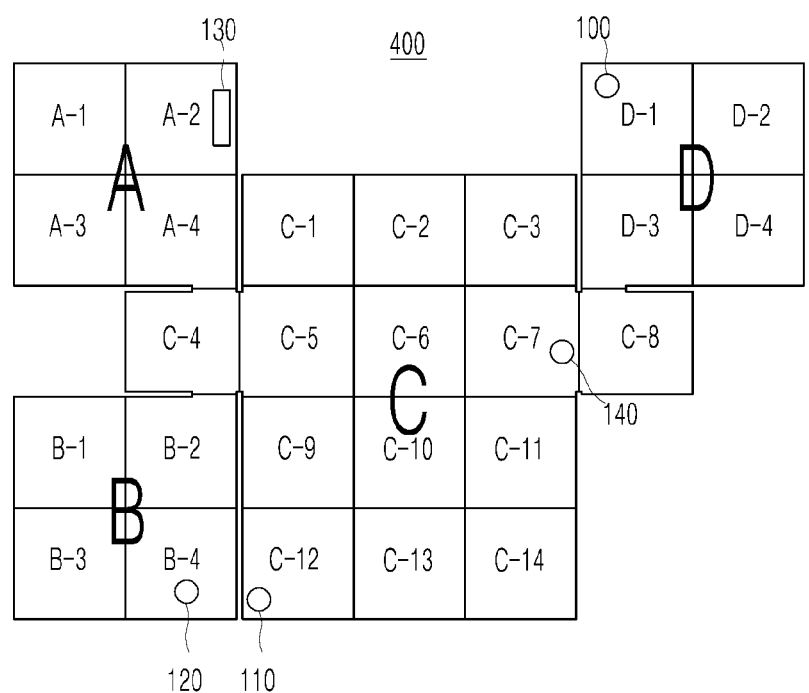
FIG. 4 is a diagram illustrating an example of a map of a cleaning target area according to an embodiment of the present disclosure.

FIG. 4 is a diagram illustrating an example of a map of a cleaning target area managed by a map manager according to an embodiment of the present disclosure. The map manager 255 may divide the map 400 of the cleaning target area into a plurality of sections. For example, the map manager 255 may divide the map 400 into a grid of any size. In an example of FIG. 4, the map 400 is divided into areas A, B, C, and D, each of which is divided into subsections.

The map manager 255 may also classify each area into a type of space that can be recognized by a human (for example, a living room, a kitchen, a bedroom, a utility room, or the like) based on the result of the image analyzer 251 analyzing the image signal received from the image sensor 211 or according to the user's input. For example, when the refrigerator 130, a kitchen stove, or a dining table is identified from the image signal for area A, the map manager may classify area A as the "kitchen."

The map manager 255 displays the location of the robot cleaner 100 on the map 400. The map manager 255 may also display the location of the home IoT devices. The location of the home IoT devices may be identified by the image analyzer 251, for example. The location of the home IoT devices may also be identified via communication with the home IoT devices or through the user's input.

Referring back to FIG. 2, the life pattern analyzer 256 is configured to determine the life pattern of the user based on the sensor signal from one or more sensors 210 or the sensor signal and/or the operation state information from another home IoT device received through the network interface 220.

In order to determine a life pattern, the life pattern analyzer 256 may identify the user's location based on the sensor signal from one or more sensors 210. The life pattern analyzer 256 may also identify the user's location based on the sensor signal or the operation state information from one or more home IoT devices. For example, the life pattern analyzer 256 may identify the user's location based on the user's presence in the image signal from the security camera 110 or the image sensor 211 and the orientation direction of the security camera 110 or the image sensor 211. The life pattern analyzer 256 may also identify the user's location based on the sound signal from the AI speaker 120 or the sound sensor 212. The life pattern analyzer 256 may also identify the user's location based on the sensor signal from the human body detector 140. The life pattern analyzer 256 may identify that the user is in the vicinity of the refrigerator based on the operation state information of the home IoT device, for example, the information that the door of the refrigerator 130 is open.

The vacuum cleaner 150 may generate the operation state information including a cleaning path, suction intensities at points on the cleaning path, and timestamps at the points, and provide them to the robot cleaner 100. The location of the vacuum cleaner 150 may be considered to match the user's location. In other words, the life pattern analyzer 256 may identify the user's location from the operation state information of the vacuum cleaner 150.

The life pattern analyzer 256 may also identify the user's location from a combination of two or more of the sensor signals and the operation state information described above. The life pattern analyzer 256 may identify the user's location as a coordinate or a section identifier on the map 400 generated by the map manager 255. If there are two or more users in the interior environment, the type of behavior of each user may be identified.

In order to determine the life pattern, the life pattern analyzer 256 may identify the type of the user's behavior based on the sensor signal from the one or more sensors 210. The life pattern analyzer 256 may also identify the type of the user's behavior based on the sensor signal from the one or more home IoT devices or the operation state information from the one or more home IoT devices. For example, the life pattern analyzer 256 may identify the type of the user's behavior from the analyzed result of the sound signal by the sound analyzer 252. The life pattern analyzer 256 may also identify that the user is cleaning from the operation state information of the vacuum cleaner 150. The type of the user's behavior may include, but is not limited to, for example, watching TV, cooking, cleaning, using a hair dryer, and going to bed. If there are two or more users in the interior environment, the type of behavior of each user may be identified.

FIG. 5 is a diagram illustrating an example of the life pattern information stored in a life pattern database according to an embodiment of the present disclosure. The life pattern analyzer 256 stores the life pattern information including the user's location, the type of the user's behavior, and a timestamp indicating the point of time in the life pattern database 258. The life pattern analyzer 256 may generate and store the life pattern information every predetermined time interval (for example, one minute). Alternatively, the life pattern analyzer 256 may generate and store the life pattern information when a change in the user's location or the type of the user's behavior is detected. The life pattern information is collected over at least one day. In order to determine daily life pattern, the life pattern information is collected over at least one week.

The life pattern analyzer 256 includes an artificial neural network that identifies the life pattern from the life pattern information collected in the life pattern database 258. The life pattern analyzer 256 may identify the life pattern according to the day of the week or the life pattern according to whether it is the holiday from the life pattern information.

For example, the life pattern analyzer 256 groups the collected life pattern information by day of the week. The life pattern analyzer 256 clusters the life pattern information grouped for the same day in accordance with common patterns. The clustering may be performed, for example, by unsupervised learning of the artificial neural network. The life pattern analyzer 256 may determine the life pattern of the user by averaging the life pattern information having the clustered common pattern. The life pattern analyzer 256 may also obtain a weight-average by giving a weight according to the generated date of the life pattern information. The weight may be given in such a manner that a higher weight is given to more recent life pattern information and a lower weight is given to older life pattern information.

In this manner, the life pattern analyzer 256 may identify the life pattern of Monday from the life pattern information corresponding to Monday, or identify the life pattern of the holiday from the life pattern information corresponding to the holiday.

The life pattern represents, for example, a regular association of the user's locations and behaviors with the times at that time. The life pattern analyzer 256 may expect the daily regular behaviors of the user from the determined life pattern. For example, the life pattern analyzer 256 may expect that the user uses a hair dryer in area B-1 around 07:30 AM every weekday, and ingests food in area A-4 or area C-11 around 07:45 AM every weekday. Further, the life pattern analyzer 256 may expect the time of the going out and the time of returning home of the user. For example, the life pattern analyzer 256 may expect the user to go out around 08:10 every weekday morning. Further, the life pattern analyzer 256 may expect that the user returns home around 07:00 PM on Monday, Tuesday, and Thursday, returns home around 05:30 PM on Wednesday, and returns home around 10:00 PM on Friday.

Figure 6:
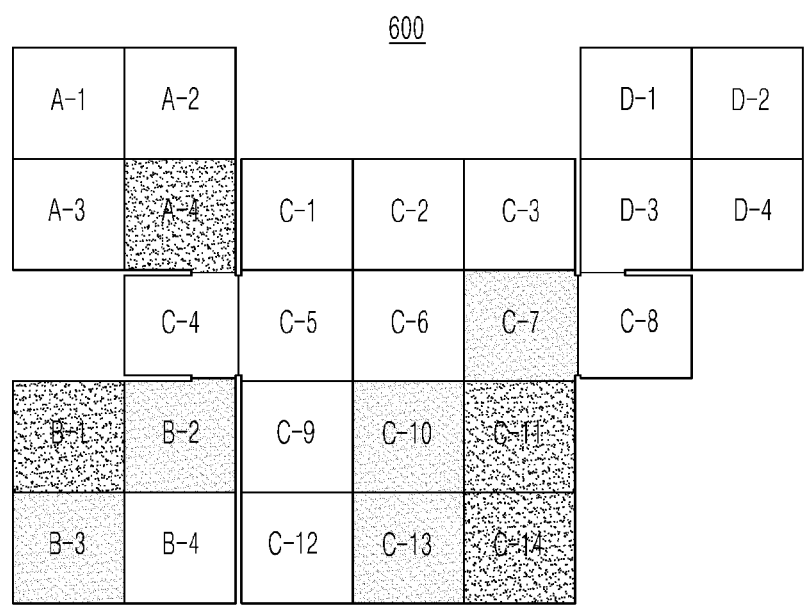
FIG. 6 is a diagram illustrating an example of a contamination distribution map according to an embodiment of the present disclosure.

The life pattern analyzer 256 may expect the degree of generation of contaminant such as dust or debris in each area based on the type of the user's behavior. FIG. 6 is a diagram illustrating an example of a contamination distribution map according to an embodiment of the present disclosure. For example, the life pattern analyzer 256 may expect that the contaminant such as hair or dust is generated by a use of a hair dryer, ingestion of food, or a behavior of children playing. The life pattern analyzer 256 may generate a contamination distribution map 600 displaying the amount of contaminants expected on the map 400 generated by the map manager 255 based on the expected degree of generation of contaminants. Exemplary contamination distribution map 600 displays that there are large amounts of contaminants in areas A-4, B-1, C-11, and C-14, and the medium degree of contaminant is present in the surrounding areas.

The cleaning scheduler 257 may determine a cleaning schedule including a cleaning start time, a cleaning end time, a cleaning path, and a suction intensity associated with the cleaning path based on the determined life pattern of the user and the contamination distribution map 600. The cleaning start time and the cleaning end time may preferably be selected from a time period during which the user is absent. In other words, the cleaning start time may be selected after the going-out time of the user, and the cleaning end time may be selected as before the expected returning home time of the user.

Figure 7:
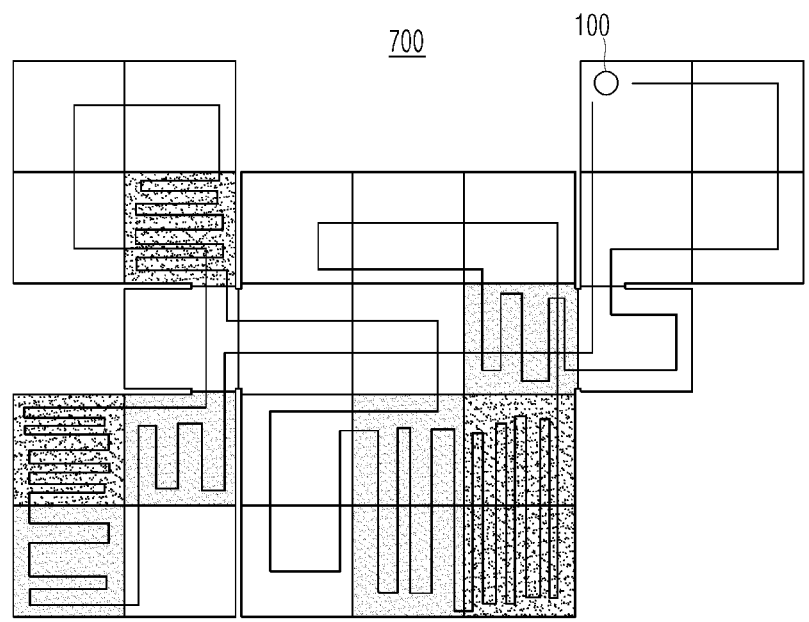
FIG. 7 is a diagram illustrating an example of a planned cleaning path according to an embodiment of the present disclosure.

FIG. 7 is a diagram illustrating an example of a planned cleaning path according to an embodiment of the present disclosure. The cleaning scheduler 257 plans the cleaning path of the vacuum cleaner on the contamination distribution map 600. The cleaning scheduler 257 plans the cleaning path so that the cleaning is performed by repeatedly passing the areas where the amount of contaminants is expected to be high (for example, A-4, B-1, C-11, and C-14) at a relatively large number of times and/or at a relatively strong suction intensity compared to other areas. The cleaning scheduler 257 may plan the cleaning path so that the cleaning is performed by passing the area where the amount of the contaminants is expected to be low at a relatively small number of times compared to other areas.

The cleaning scheduler 257 may plan the cleaning schedule so as to clean the area requiring cleaning within the determined cleaning start time and cleaning end time. For example, the cleaning scheduler 257 may determine the moving speed of the robot cleaner so as to pass through all the cleaning paths within the determined cleaning start time and cleaning end time.

In another embodiment, the life pattern information of the user may include the operation state information of the vacuum cleaner 150 received from the vacuum cleaner 150. The operation state information of the vacuum cleaner 150 includes a cleaning path of the vacuum cleaner 150, suction intensities at points on the cleaning path, and timestamps at the points. The operation state information of the vacuum cleaner is collected over at least one day, or collected over at least one week to determine a daily life pattern.

Figure 8:
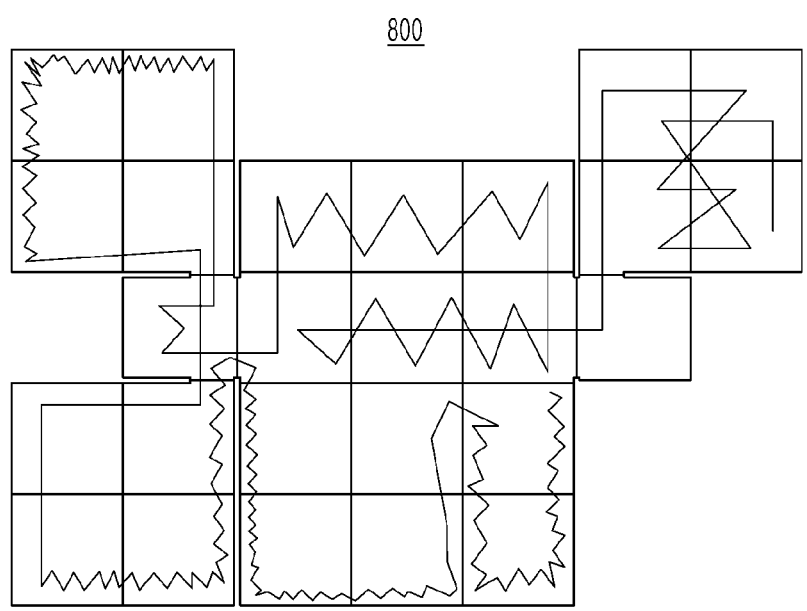
FIG. 8 is a diagram illustrating an example of a cleaning path of a vacuum cleaner according to an embodiment of the present disclosure.

FIG. 8 is a diagram illustrating an example of a cleaning path of the vacuum cleaner 150 according to an embodiment of the present disclosure. The vacuum cleaner 150 may record its location (particularly, the location of the head) and the suction intensity at that time during the cleaning operation. The vacuum cleaner 150 may generate a cleaning path map 800 that records the cleaning path, the suction intensity, and the timestamp on the map 400 generated by the map manager 255. The operation state information including the cleaning path map 800 may be transmitted from the vacuum cleaner 150 to the robot cleaner 100, and stored in the life pattern database 258 as part of the life pattern information.

The cleaning scheduler 257 may determine the cleaning path of the robot cleaner 100 considering the cleaning path of the vacuum cleaner 150. For example, the cleaning scheduler 257 may cluster the cleaning paths of the vacuum cleaner 150 acquired over time of one day or more according to a common pattern. The clustering may be performed, for example, by unsupervised learning of the artificial neural network. The cleaning scheduler 257 may determine the cleaning path of the robot cleaner 100 by averaging the cleaning paths having the clustered common pattern. In order to determine the cleaning path of the robot cleaner 100, the cleaning scheduler 257 may also obtain a weight-average by giving a weight according to a generated date of the clustered cleaning paths. The weight may be given in such a manner as to give a higher weight to more recent cleaning path and to give a lower weight to an older cleaning path.

The cleaning scheduler 257 may determine the cleaning start time and the cleaning end time so as to perform the cleaning at a time similar to the time when the user performs the cleaning using the vacuum cleaner 150. For example, when the cleaning scheduler 257 determines the cleaning path of the robot cleaner 100 by giving a weight to the cleaning paths, the cleaning scheduler 257 may determine a weight-averaged timestamps at points on the cleaning path by also giving a weight to the timestamps at the points on the cleaning path. The cleaning scheduler 257 may determine the cleaning schedule based on the cleaning path and the timestamps on the cleaning path, which have been thus determined.

For example, if a user who regularly cleans using a vacuum cleaner does not perform cleaning at a regular time due to a special circumstance, the cleaning scheduler 257 may determine the cleaning schedule so as to perform cleaning according to the cleaning pattern of the user.

Figure 9:
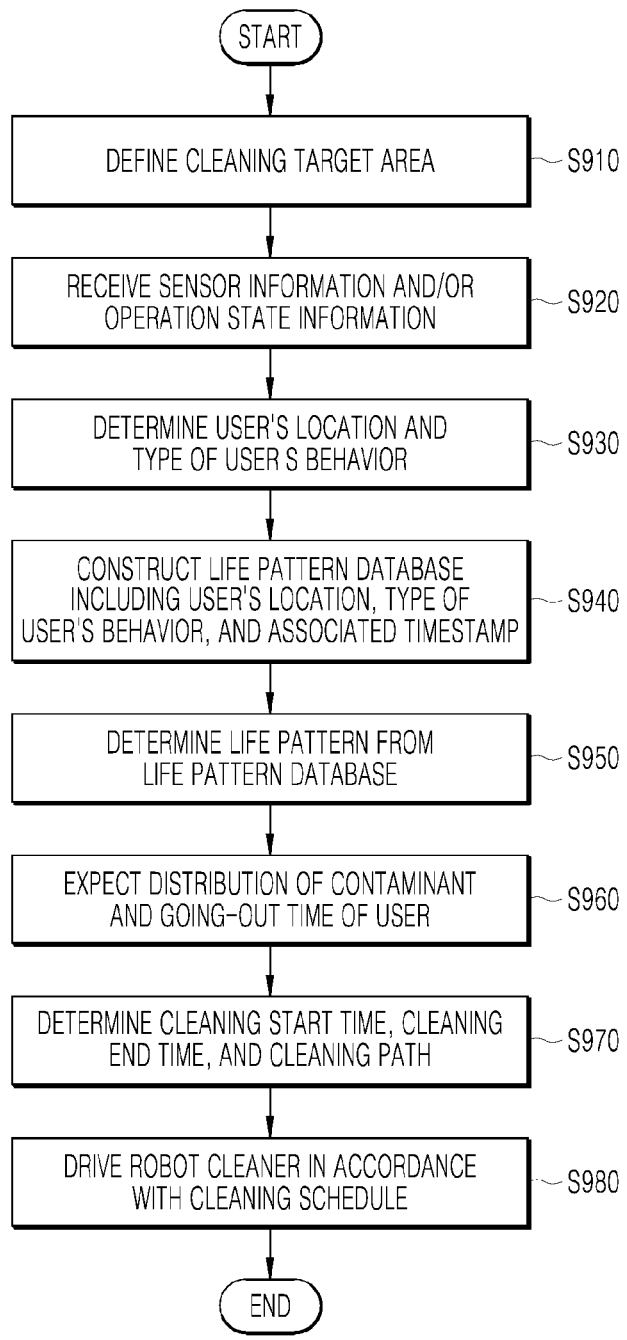
FIG. 9 is a flowchart of a method of operating a robot cleaner according to an embodiment of the present disclosure.

FIG. 9 illustrates a flowchart of a method of operating a robot cleaner according to an embodiment of the present disclosure.

In step S910, the controller 250 generates a map of the cleaning target area that defines the cleaning target area. The controller 250 may generate the map of the cleaning target area by identifying the location of the robot cleaner 100 and the location of the wall or the obstacle.

In step S920, the controller 250 receives the sensor signal from the one or more sensors 210, and receives the sensor signal and/or the operation state information from the one or more home IoT devices. The sensor signal and/or the operation state information from the one or more home IoT devices may be received through the network interface 220.

In step S930, the controller 250 determines the user's location and the type of the user's behavior. The user's location and the type of the user's behavior may be identified based on at least one of the received sensor signal or operation state information. In particular, the type of the user's behavior may be identified based on the analysis of the image signal or the sound signal by the image analyzer 251 or the sound analyzer 252. If there are two or more users in the interior environment, the type of each user's behavior may be identified.

In step S940, the controller 250 constructs the life pattern database 258 by storing the life pattern information including the user's location, the type of the user's behavior, and the timestamp associated therewith. The life pattern information may be stored every predetermined time interval (for example, one minute), or stored whenever a change in the user's location or the type of the user's behavior is detected. The life pattern information is collected over one day or more or over one week or more.

In step S950, the controller 250 determines a life pattern based on the life pattern information of the life pattern database 258. The controller 250 determines the life pattern of the user by clustering the collected life pattern information in accordance with common patterns using the artificial neural network, and averaging the clustered life pattern information. In order to determine the life pattern of the user, the controller 250 may also obtain a weight-average by giving a weight according to the generated date of the life pattern information. The weight may be given in such a manner that a higher weight is given to more recent life pattern information and a lower weight is given to older life pattern information.

In step S960, the controller 250 expects the distribution of contaminants, the going-out time and the returning home time of the user based on the determined life pattern. In particular, the controller 250 may generate the contamination distribution map 600 representing the distribution of contaminants in the cleaning target area, based on the user's location and the type of the user's behavior.

In step S970, the controller 250 determines a cleaning schedule including a cleaning start time, a cleaning end time, and a cleaning path. The cleaning path is determined based on the contamination distribution map 600. The cleaning start time and the cleaning end time are determined based on the going-out time and returning home time of the user. For example, the cleaning start time and the cleaning end time may be determined from a time period during which the user is absent.

In step S980, the controller 250 drives the robot cleaner according to a cleaning schedule. The controller 250 controls the suction blower and the driving wheel to perform cleaning along the determined cleaning path.

Figure 10:
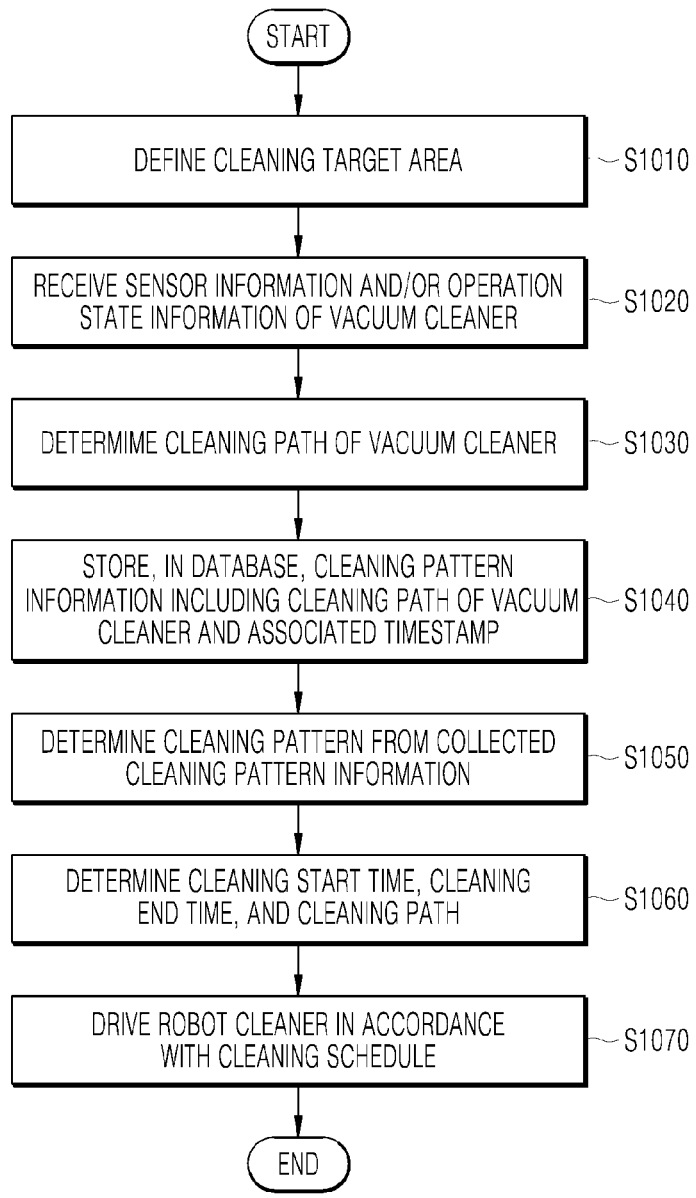
FIG. 10 is a flowchart of a method of operating a robot cleaner according to another embodiment of the present disclosure.

FIG. 10 illustrates a flowchart of a method of operating a robot cleaner according to another embodiment of the present disclosure.

In step S1010, the controller 250 generates a map of the cleaning target area that defines the cleaning target area. The controller 250 may generate the map of the cleaning target area by identifying the location of the robot cleaner 100 and the location of a wall or an obstacle.

In step S1020, the controller 250 receives operation state information from the vacuum cleaner 150. The operation state information of the vacuum cleaner 150 includes a location of the vacuum cleaner 150, the suction intensity at its location, and the timestamp at its location.

In step S1030, the controller 250 may determine a cleaning path of the vacuum cleaner 150 based on the operation state information received from the vacuum cleaner 150. For example, the controller 250 may display the cleaning path of the vacuum cleaner 150 on the map 400 of the cleaning target area. Alternatively, the controller 250 may also receive the operation state information including the cleaning path map 800 that records the cleaning path, the suction intensity, and the timestamp from the vacuum cleaner 150.

In step S1040, the controller 250 stores, in the life pattern database, the cleaning pattern information including the cleaning path of the vacuum cleaner 150, the suction intensities at points on the cleaning path, and the timestamps associated with the points as the life pattern information. The cleaning pattern information is collected over one day or more or over one week or more.

In step S1050, the controller 250 determines a cleaning pattern of the user from the collected cleaning pattern information. The cleaning pattern may be determined by giving a weight to the times at which the user performs the cleaning using the vacuum cleaner 150 and the cleaning paths of the vacuum cleaner 150.

In step S1060, the controller 250 determines a cleaning schedule including a cleaning start time, a cleaning end time, and a cleaning path based on the determined cleaning pattern. For example, when the user who regularly cleans using the vacuum cleaner does not perform cleaning at a regular time due to a special circumstance, the controller 250 may determine the cleaning schedule so as to perform cleaning according to the cleaning pattern of the user.

In step S1070, the controller 250 drives the robot cleaner according to the cleaning schedule. The controller 250 controls the suction blower and the driving wheel to perform cleaning along the determined cleaning path.

The example embodiments described above may be implemented through computer programs executable through various components on a computer, and such computer programs may be recorded on computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of computer programs may include both machine codes, such as produced by a compiler, and higher-level codes that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

The order of individual steps in process claims according to the present disclosure does not imply that the steps must be performed in this order; rather, the steps may be performed in any suitable order, unless expressly indicated otherwise. The present disclosure is not necessarily limited to the order of operations given in the description. All examples described herein or the terms indicative thereof ("for example," "such as") used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various modifications, combinations, and alternations may be made depending on design conditions and factors within the scope of the appended claims or equivalents thereof.

The present disclosure is not limited to the example embodiments described above, and rather intended to include the following appended claims, and all modifications, equivalents, and alternatives falling within the spirit and scope of the following claims.

What is claimed is:

1. A method for operating a robot cleaner, comprising:
   defining a cleaning target area;
   identifying a location of a user and a type of a behavior of the user, based on at least one of a sensor signal from one or more sensors disposed in the robot cleaner, a sensor signal from one or more home appliances, or operation state information from the one or more home appliances;
   collecting life pattern information of the user including the location of the user, the type of the behavior of the user, and timestamps each associated therewith, wherein the life pattern information is collected during a time period of one day or more;
   determining a distribution of contaminant in the cleaning target area based on the location of the user and the type of the behavior of the user;
   determining a cleaning schedule of the robot cleaner based on the collected life pattern information, wherein the cleaning schedule includes a cleaning time and a cleaning path, and the cleaning time is selected from the times when the user is absent in the cleaning target area, wherein the cleaning path is determined based on the distribution of the contaminant; and
   operating the robot cleaner so as to perform cleaning in accordance with the determined cleaning schedule.

2. The method of claim 1, wherein the cleaning schedule further comprises suction intensities associated with points on the cleaning path, and
   wherein determining the cleaning schedule comprises determining the suction intensity based on the distribution of the contaminant.

3. The method of claim 1, further comprising grouping the collected life pattern information in accordance with a day of a week, wherein the life pattern information is collected during the time period of one week or more,
   wherein determining the cleaning schedule comprises determining the cleaning schedule of the robot cleaner based on a group of the life pattern information corresponding to the day of the week when cleaning will be performed.

4. A robot cleaner comprising:
   one or more sensors;
   a driving wheel configured to move the robot cleaner on a floor;
   a suction blower configured to suck air; and
   a controller configured to:
   define a cleaning target area based on a sensor signal from the one or more sensors and operation information of the driving wheel;
   identify a location of a user and a type of a behavior of the user based on the sensor signal from the one or more sensors;
   collect life pattern information of the user comprising the location of the user, the type of the behavior of the user, and timestamps each associated therewith, wherein the life pattern information is collected during a time period of one day or more;
   determine a distribution of contaminant in the cleaning target area based on the location of the user and the type of the behavior of the user;
   determine a cleaning schedule of the robot cleaner based on the collected life pattern information, wherein the cleaning schedule comprises a cleaning time and a cleaning path, and the cleaning time is selected from the times when the user is absent in the cleaning target area, wherein the cleaning path is determined based on the distribution of the contaminant; and
   operate the driving wheel and the suction blower so as to perform cleaning in accordance with the determined cleaning schedule.

5. The robot cleaner of claim 4, further comprising a network interface configured to communicate with one or more home appliances,
   wherein the controller is further configured to determine the location of the user and the type of the behavior of the user further based on at least one of the sensor signal or operation state information from the one or more home appliances.

6. The robot cleaner of claim 4, wherein the cleaning schedule further comprises suction intensities associated with points on the cleaning path, and
   wherein the controller is further configured to determine the suction intensity based on the distribution of the contaminant.

7. The robot cleaner of claim 4, wherein the life pattern information further comprises cleaning path information of a vacuum cleaner operated by the user, and
   wherein the controller is further configured to determine the cleaning path based on the cleaning path information of the vacuum cleaner.

8. The robot cleaner of claim 4, wherein the controller is further configured to:
   group the collected life pattern information in accordance with a day of a week, wherein the life pattern information is collected during a time period of one week or more, and determine a cleaning schedule of the robot cleaner based on a group of the life pattern information corresponding to the day of the week when cleaning will be performed.

9. The robot cleaner of claim 4, wherein the controller comprises an artificial neural network which has been trained in advance to identify from a sensor signal the type of behavior associated with the sensor signal.

10. The robot cleaner of claim 4, wherein the controller is further configured to:
cluster the collected life pattern information in accordance with patterns using an artificial neural network,
give a weight to the life pattern information having a common pattern, and
determine the cleaning schedule based on a weight-averaged life pattern information.

11. A method for operating a robot cleaner, comprising:
defining a cleaning target area;
identifying a location of a user and a type of a behavior of the user, based on at least one of a sensor signal from one or more sensors disposed in the robot cleaner, a sensor signal from one or more home appliances, or operation state information from the one or more home appliances;
collecting life pattern information of the user including the location of the user, the type of the behavior of the user, and timestamps each associated therewith, wherein the life pattern information is collected during a time period of one day or more, wherein the life pattern information further comprises cleaning path information of a vacuum cleaner operated by the user;
determining a cleaning schedule of the robot cleaner based on the collected life pattern information, wherein the cleaning schedule includes a cleaning time and a cleaning path, and the cleaning time is selected from the times when the user is absent in the cleaning target area, wherein the cleaning schedule is determined based on the cleaning path information of the vacuum cleaner; and
operating the robot cleaner so as to perform cleaning in accordance with the determined cleaning schedule.

12. A method for operating a robot cleaner, comprising:
defining a cleaning target area;
identifying a location of a user and a type of a behavior of the user, based on at least one of a sensor signal from one or more sensors disposed in the robot cleaner, a sensor signal from one or more home appliances, or operation state information from the one or more home appliances;
collecting life pattern information of the user including the location of the user, the type of the behavior of the user, and timestamps each associated therewith, wherein the life pattern information is collected during a time period of one day or more, wherein the type of the behavior of the user is identified using an artificial neural network that has been trained in advance to identify, from a sensor signal, the type of behavior associated with the sensor signal;
determining a cleaning schedule of the robot cleaner based on the collected life pattern information, wherein the cleaning schedule includes a cleaning time and a cleaning path, and the cleaning time is selected from the times when the user is absent in the cleaning target area; and
operating the robot cleaner so as to perform cleaning in accordance with the determined cleaning schedule.

13. A method for operating a robot cleaner, comprising:
defining a cleaning target area;
identifying a location of a user and a type of a behavior of the user, based on at least one of a sensor signal from one or more sensors disposed in the robot cleaner, a sensor signal from one or more home appliances, or operation state information from the one or more home appliances;
collecting life pattern information of the user including the location of the user, the type of the behavior of the user, and timestamps each associated therewith, wherein the life pattern information is collected during a time period of one day or more;
determining a cleaning schedule of the robot cleaner based on the collected life pattern information, wherein the cleaning schedule includes a cleaning time and a cleaning path, and the cleaning time is selected from the times when the user is absent in the cleaning target area, wherein the cleaning schedule is determined by:
clustering the collected life pattern information in accordance with patterns using an artificial neural network;
giving a weight to the life pattern information having a common pattern; and
determining the cleaning schedule based on a weight-averaged life pattern information; and
operating the robot cleaner so as to perform cleaning in accordance with the determined cleaning schedule.

14. A computer-readable storage medium having a computer program stored thereon, wherein the computer program comprises instructions configured to perform, when executed by one or more processors, a method of operating a robot cleaner by:
defining a cleaning target area;
identifying a location of a user and a type of a behavior of the user, based on at least one of a sensor signal from one or more sensors disposed in the robot cleaner, a sensor signal from one or more home appliances, or operation state information from the one or more home appliances;
collecting life pattern information of the user including the location of the user, the type of the behavior of the user, and timestamps each associated therewith, wherein the life pattern information is collected during a time period of one day or more;
determining a distribution of contaminant in the cleaning target area based on the location of the user and the type of the behavior of the user;
determining a cleaning schedule of the robot cleaner based on the collected life pattern information, wherein the cleaning schedule includes a cleaning time and a cleaning path, and the cleaning time is selected from the times when the user is absent in the cleaning target area, wherein the cleaning path is determined based on the distribution of the contaminant; and
operating the robot cleaner so as to perform cleaning in accordance with the determined cleaning schedule.

* * * * *